US010759980B1

(12) United States Patent
Zhou et al.

(10) Patent No.: US 10,759,980 B1
(45) Date of Patent: Sep. 1, 2020

(54) PACKAGED PRE-ADHESIVE COMPOSITION INCLUDING A POLYLACTIC ACID-CONTAINING PACKAGING MATERIAL, ADHESIVES, AND ARTICLES

(71) Applicant: 3M INNOVATIVE PROPERTIES COMPANY, St. Paul, MN (US)

(72) Inventors: Ning Zhou, Vadnais Heights, MN (US); Thomas E. Augustine, Hager City, WI (US); Thomas Q. Chastek, St. Paul, MN (US); Derek J. Dehn, Maplewood, MN (US); Anish Kurian, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 322 days.

(21) Appl. No.: 16/061,543

(22) PCT Filed: Dec. 2, 2016

(86) PCT No.: PCT/US2016/064580
§ 371 (c)(1),
(2) Date: Jun. 12, 2018

(87) PCT Pub. No.: WO2017/112386
PCT Pub. Date: Jun. 29, 2017

Related U.S. Application Data

(60) Provisional application No. 62/270,887, filed on Dec. 22, 2015.

(51) Int. Cl.
| | |
|---|---|
| *C09J 167/04* | (2006.01) |
| *C09J 131/04* | (2006.01) |
| *C09J 133/08* | (2006.01) |
| *C09J 133/10* | (2006.01) |
| *C08K 5/00* | (2006.01) |
| *C08K 5/11* | (2006.01) |

(52) U.S. Cl.
CPC ........... *C09J 167/04* (2013.01); *C08K 5/0016* (2013.01); *C08K 5/11* (2013.01); *C09J 131/04* (2013.01); *C09J 133/08* (2013.01); *C09J 133/10* (2013.01); *C09J 2205/102* (2013.01); *C09J 2205/30* (2013.01); *C09J 2431/00* (2013.01); *C09J 2433/00* (2013.01); *C09J 2467/00* (2013.01)

(58) Field of Classification Search
CPC ..................................................... C09J 167/04
See application file for complete search history.

(56) References Cited

U.S. PATENT DOCUMENTS

| | | | |
|---|---|---|---|
| 3,347,935 A | 10/1967 | Kaupp | |
| 3,692,884 A | 9/1972 | Gaskell | |
| 3,976,606 A | 8/1976 | Gobran | |
| 4,181,752 A | 1/1980 | Martens | |
| 4,374,883 A | 2/1983 | Winslow | |
| 4,677,096 A | 6/1987 | Van Der Smissen | |
| 4,798,201 A | 1/1989 | Rawlings | |
| 4,810,523 A | 3/1989 | Williams | |
| 5,164,441 A | 11/1992 | Yang | |
| 5,216,050 A | 6/1993 | Sinclair | |
| 5,223,465 A | 6/1993 | Ueki | |
| 5,290,615 A | 3/1994 | Tushaus | |
| RE34,605 E | 5/1994 | Schrenk | |
| 5,360,659 A | 11/1994 | Arends | |
| 5,387,623 A | 2/1995 | Ryan | |
| 5,457,175 A | 10/1995 | Scharrer | |
| 5,579,162 A | 11/1996 | Bjornard | |
| 5,623,011 A | 4/1997 | Bernard | |
| 5,695,837 A | 12/1997 | Everaerts | |
| 5,726,220 A | 3/1998 | Tokushige | |
| 5,804,610 A | 9/1998 | Hamer | |
| 5,882,774 A | 3/1999 | Jonza | |
| 6,048,611 A | 4/2000 | Lu | |
| 6,049,419 A | 4/2000 | Wheatley | |
| 6,160,083 A | 12/2000 | Thompson | |
| 6,294,249 B1 | 9/2001 | Hamer | |
| 6,489,392 B1 | 12/2002 | Lappalainen | |
| 6,710,128 B1 | 3/2004 | Helmer | |
| 6,930,219 B2 | 8/2005 | Shan | |
| 7,008,987 B2 | 3/2006 | Okada | |
| 7,294,861 B2 | 11/2007 | Schardt | |
| 7,559,981 B2 | 7/2009 | Friday | |
| 8,124,169 B2 | 2/2012 | Ylitalo | |

(Continued)

FOREIGN PATENT DOCUMENTS

| | | |
|---|---|---|
| CN | 103214695 | 2/2017 |
| DE | 4428645 | 2/1995 |

(Continued)

OTHER PUBLICATIONS

Alothman, "A Review: Fundamental Aspects of Silicate Mesoporous Materials", Materials, 2012, vol. 5, No. 12, pp. 2874-2902.
Alslaibi, "A review: production of activated carbon from agricultural byproducts via conventional and microwave heating", Journal of Chemical Technology and Biotechnology, 2013, vol. 88, pp. 1183-1190.
Barrer, "Molecular Diffusion in Chabazite, Mordenite and Levynite", Transactions of the Faraday Society, 1953, vol. 49, pp. 1049-1059.
Boettcher, "Silica Sol-Gel Glasses with Embedded Organic Liquids", Advanced Materials, 1999, vol. 11, No. 2, pp. 138-141.
Eguiburu, "Blends of amorphous and crystalline polylactides with poly(methyl methacrylate) and poly(methyl acrylate): a miscibility study", Polymer, 1998, vol. 39, No. 26, pp. 6891-6897.

(Continued)

*Primary Examiner* — Daniel H Lee
(74) *Attorney, Agent, or Firm* — Jean A. Lown

(57) ABSTRACT

A polymerizable pre-adhesive composition includes packaging material and a packaged pre-adhesive reactive mixture sealed within the packaging material. The packaging material includes: a semicrystalline polylactic acid (PLA); a polyvinyl acetate (PVAc); and a plasticizer; wherein the PLA/PVAc-containing packaging material has a single $T_g$ of less than 25° C. and a normalized Haze value of less than 10% per 25 microns.

19 Claims, No Drawings

(56) References Cited

U.S. PATENT DOCUMENTS

| | | |
|---|---|---|
| 8,450,420 B2 | 5/2013 | Sakurai |
| 8,742,022 B2 | 6/2014 | Pokorny |
| 9,828,530 B2 | 11/2017 | Ali |
| 2007/0092733 A1 | 4/2007 | Yang |
| 2007/0179218 A1 | 8/2007 | Brake |
| 2007/0276090 A1 | 11/2007 | Aoki |
| 2008/0199704 A1 | 8/2008 | Ho |
| 2009/0018237 A1 | 1/2009 | Fujii |
| 2009/0087629 A1 | 4/2009 | Everaerts |
| 2010/0086705 A1 | 4/2010 | Everaerts |
| 2011/0207858 A1 | 8/2011 | Pfaadt et al. |
| 2012/0015002 A1 | 1/2012 | Ali |
| 2012/0270978 A1 | 10/2012 | Myers |
| 2012/0328808 A1 | 12/2012 | Mehlmann |
| 2013/0209770 A1 | 8/2013 | Topolkaraev et al. |
| 2014/0130827 A1 | 5/2014 | Dotterman |
| 2014/0138131 A1 | 5/2014 | Hao |
| 2014/0170362 A1 | 6/2014 | Ali |
| 2014/0186250 A1 | 7/2014 | Levan |
| 2015/0024019 A1 | 1/2015 | Ali |
| 2015/0035204 A1 | 2/2015 | Stoner |
| 2015/0140329 A1 | 5/2015 | Tanrikulu |
| 2015/0175812 A1 | 6/2015 | Ali |
| 2015/0293028 A1 | 10/2015 | Kang |
| 2015/0353786 A1* | 12/2015 | Sherman ............... B05D 1/265 428/327 |
| 2016/0001530 A1 | 1/2016 | Uto et al. |
| 2018/0105628 A1 | 4/2018 | Wendland |

FOREIGN PATENT DOCUMENTS

| | | |
|---|---|---|
| EP | 0624392 | 11/1994 |
| EP | 2078696 | 7/2009 |
| JP | 2003-286401 | 10/2003 |
| JP | 2004-010842 | 1/2004 |
| JP | 4223269 | 6/2004 |
| JP | 2011-006615 | 1/2011 |
| WO | WO 97/33945 | 9/1997 |
| WO | WO 03/095514 | 11/2003 |
| WO | WO 2006/103754 | 10/2006 |
| WO | WO 2008/043716 | 4/2008 |
| WO | WO 2014/018817 | 1/2014 |
| WO | WO 2014/078088 | 5/2014 |
| WO | WO 2014/093375 | 6/2014 |
| WO | WO 2014/105584 | 7/2014 |
| WO | WO 2015/157612 | 10/2015 |
| WO | WO 2015/157615 | 10/2015 |
| WO | WO 2015/195602 | 12/2015 |
| WO | WO 2015/195616 | 12/2015 |
| WO | WO 2015/195617 | 12/2015 |
| WO | WO 2016/105998 | 6/2016 |
| WO | WO 2016/109176 | 7/2016 |
| WO | WO 2017/106443 | 6/2017 |
| WO | WO 2017/106448 | 6/2017 |
| WO | WO 2017/112450 | 6/2017 |
| WO | WO 2018/102267 | 6/2018 |

OTHER PUBLICATIONS

Gajria, "Miscibility and biodegradability of blends of poly(lactic acid) and poly(vinyl acetate)", Polymer, 1996, vol. 37, No. 3, pp. 437-444.

Hao, "Thermal and Mechanical Properties of Polylactide Toughened with a Butyl Acrylate-Ethyl Acrylate-Glycidyl Methacrylate Copolymer", Chinese Journal of Polymer Science, 2013, vol. 31, No. 11, pp. 1519-1527.

Meng, "Transparent and ductile poly(lactic acid)/poly(butyl acrylate) (PBA) blends: Structure and properties", European Polymer Journal, 2012, vol. 48, pp. 127-135.

Niu, "Highly dispersed Ru on K-doped meso-macroporous $SiO_2$ for the preferential oxidation of CO in $H_2$-rich gasses", International Journal of Hydrogen Energy, 2014, vol. 39, pp. 13800-13807.

Song, "Coordination of Metal Cations with Amino-Functionalized MCM-41 for Adsorptive Desulfurization", Advanced Materials Research, May 2014, vols. 926-930, pp. 4222-4225.

Temel, "Photopolymerization and photophysical properties of amine linked benzophenone photoinitiator for free radical polymerization", Journal of Photochemistry and Photobiology A: Chemistry, 2011, vol. 219, No. 1, pp. 26-31.

Yang, "A Pervaporation Study of Ammonia Solutions Using Molecular Sieve Silica Membranes", Membranes, 2014, vol. 4, pp. 40-54.

International Search Report for PCT International Application No. PCT/US2016/064580, dated Feb. 9, 2017, 4 pages.

* cited by examiner

PACKAGED PRE-ADHESIVE COMPOSITION INCLUDING A POLYLACTIC ACID-CONTAINING PACKAGING MATERIAL, ADHESIVES, AND ARTICLES

CROSS REFERENCE TO RELATED APPLICATIONS

This application is a national stage filing under 35 U.S.C. 371 of PCT/US2016/064580, filed Dec. 2, 2016, which claims the benefit of U.S. Provisional Application No. 62/270,887, filed Dec. 22, 2015, the disclosure of which is incorporated by reference in its/their entirety herein.

BACKGROUND

Polylactic acid (referred to herein as "PLA") is becoming an important industrial chemical because it is a biodegradable plastic that is not derived from petroleum. PLA is a renewable resource that is derived from corn, potatoes, and various plants. PLA is referred to as a carbon circulation-type plastic because it is produced from lactic acid and after use can be broken down to water and carbon dioxide through biodegradation or incineration.

PLA has a mechanical strength at room temperature that is close to that of polyethylene terephthalate (PET), and is easily manipulated. Because of these characteristics, PLA is expected to become a general-purpose plastic material that is commonly used in daily life. PLA does, however, have drawbacks based on its heat resistance, fragility, and low flexibility.

One particular suggested use of PLA is in the area of adhesives, particularly adhesives that are prepared in packages (e.g., packets or containers). For this particular use, however, flexibility is important. Thus, enhancing the flexibility of PLA has received much attention, and numerous methods for improving that characteristic have been proposed.

In one method of improving the flexibility, other aliphatic ester, ether, or carbonate components are introduced into the polylactic acid skeleton by copolymerization in order to impart more flexibility. This method increases the cost of the resulting product because of the nature and amount of the added components.

Another method of improving the flexibility of PLA adds a plasticizer having a low molecular weight (for example, polyethylene glycol) to the PLA. Addition of a plasticizer, however, causes bleeding (separation) of the plasticizer from the surface, which can result in a sticky, tacky surface.

Yet another method of improving the flexibility of PLA blends polyolefins, such as low-density polyethylene (LDPE), with PLA. Because polyolefins and PLA are not compatible with each other, macroscopic phase separation occurs and as a result, the PLA blends became optically opaque. This is not desirable or acceptable for applications where optical transparency is important.

Other methods of improving the flexibility of PLA includes the addition of an acrylic acid ester resin having a relatively low glass transition temperature ($T_g$) to the PLA, the addition of a second polymer (having a weight average molecular weight of 30,000 g/mole or less) mainly comprising an unsaturated alkyl carboxylate-based unit that has a glass transition temperature of 10° C. or less, or the addition of an acrylic acid ester-based oligomer. These methods typically do not provide a PLA resin with the desired combination of flexibility and elongation properties. Further, in some of the known packaging materials where a second polymeric or oligomeric material is added to the PLA and the packaging materials are held at room temperature for several days, the second polymeric or oligomeric material can separate from the packaging material resulting in a sticky texture that is not useful. Therefore, there remains a need for further methods of enhancing at least one property of a PLA packaging material.

SUMMARY

The present disclosure provides packaged pre-adhesive compositions, adhesive compositions, and articles.

A packaged pre-adhesive composition includes packaging material and a polymerizable pre-adhesive reactive mixture sealed within the packaging material. The packaging material includes: a semicrystalline polylactic acid (PLA); a polyvinyl acetate (PVAc); and a plasticizer; wherein the PLA/PVAc-containing packaging material has a single $T_g$ of less than 25° C. and a normalized Haze value of less than 10% per 25 microns.

Upon formation of an adhesive from the packaged pre-adhesive composition, the PLA/PVAc-containing packaging material forms polymer particles within the adhesive. In certain embodiments, the PLA-containing polymer particles have a refractive index that is no more than ±0.02, or no more than ±0.01, of the refractive index of the polymer present in a major amount in the adhesive. At least some of the particles have an average particle size that is larger than the wavelength of visible light.

In certain embodiments, the adhesive is optically transparent and includes a (meth)acrylate-based copolymer having a refractive index of at least 1.43 (as the polymer present in the major amount), and PLA-containing polymer particles.

The terms "polymer" and "polymeric material" include, but are not limited to, organic homopolymers, copolymers, such as for example, block, graft, random and alternating copolymers, etc., and blends and modifications thereof. Herein, "copolymer" is used to refer to a polymer derived from two or more types of monomers, and includes terpolymers, tetrapolymers, etc. Furthermore, unless otherwise specifically limited, the term "polymer" shall include all possible geometrical configurations of the material. These configurations include, but are not limited to, isotactic, syndiotactic, and atactic symmetries.

Pressure sensitive adhesive compositions are well known to those of ordinary skill in the art to possess properties including the following: (1) aggressive and permanent tack, (2) adherence with no more than finger pressure, (3) sufficient ability to hold onto an adhered, and (4) sufficient cohesive strength to be cleanly removable from the adhered. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The terms "glass transition temperature" and "$T_g$" are used interchangeably. Typically $T_g$ values are measure using Differential Scanning calorimetry (DSC) unless otherwise noted.

The term "room temperature" refers to ambient temperature, generally 20-22° C., unless otherwise noted.

The term "(meth)acrylate" refers to monomeric acrylic or methacrylic esters of alcohols. Acrylate and methacrylate monomers or oligomers are referred to collectively herein as "(meth)acrylates." Polymers described as "(meth)acrylate-based" are polymers or copolymers prepared primarily (greater than 50% by weight) from (meth)acrylate monomers and may include additional ethylenically unsaturated monomers.

Unless otherwise indicated, "optically transparent" refers to an article, film or adhesive composition that has a high light transmittance (e.g., at least 85%) over at least a portion of the visible light spectrum (about 400 to about 700 nm).

Unless otherwise indicated, "optically clear" refers to an adhesive or article that has a high (e.g., at least 85%) light transmittance over at least a portion of the visible light spectrum (about 400 to about 700 nm), and that exhibits low haze. More specifically, "optically clear" means that a material (in a 50 micron thick layer) has an optical transmission value of at least 85%, preferably at least 90%, and a haze of less than 5%. In some embodiments, the optically clear compositions may have a visible light transmission of greater than 95% and/or a haze value of less than 2%.

The term "optical transmission value" refers to the percentage of light that is not reflected back toward the source as a percentage of the total incident light at a wavelength of 400-700 nm (light emitted/light source×100). Also, in certain embodiments, the polymerized acrylate pressure-sensitive adhesive demonstrates less than 2% haze, preferably less than 1% haze. A small amount of haze may be desirable in certain situations, e.g., for hiding power.

The term "wavelength of visible light" as used herein encompasses the wavelengths of the light spectrum that constitutes visible light (about 400 to about 700 nm).

Refractive index is defined herein as the absolute refractive index of a material (e.g., a monomer or the polymerized product thereof) which is understood to be the ratio of the speed of electromagnetic radiation in free space to the speed of the radiation in that material, with the radiation being of sodium yellow light at a wavelength of about 583.9 nanometers (nm). The refractive index can be measured using known methods and is generally measured using an Abbe Refractometer.

Herein, the terms "comprises" and "includes" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to claims of the disclosure that may afford certain benefits, under certain circumstances. However, other claims may also be preferred, under the same or other circumstances. Furthermore, the recitation of one or more preferred claims does not imply that other claims are not useful, and is not intended to exclude other claims from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "includes at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C. or 22° C. to 25° C.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION OF ILLUSTRATIVE EMBODIMENTS

The use of adhesives, especially pressure sensitive adhesives, in areas such as the medical, electronic, automotive, and optical industries is increasing. The requirements of these industries place additional demands upon the pressure sensitive adhesive beyond the traditional properties of tack, peel adhesion, and shear strength. New classes of materials are desirable to meet the increasingly demanding performance requirements for pressure sensitive adhesives. Among the performance requirements for new classes of pressure sensitive adhesives are optical properties such as being optically transparent or optically clear.

Many classes of pressure sensitive adhesives have been prepared to address the increased need for performance issues. Of these, 100% solids adhesive systems have been developed. Among these 100% solids systems are hot melt processable adhesives, including hot melt processable pressure sensitive adhesives.

Because 100% solids pressure sensitive adhesives are tacky polymeric compositions, handling of these compositions, especially on a large scale can be problematic. A wide variety of techniques have been developed to deal with these handling issues. One such technique is the preparation of pressure sensitive adhesive polymers or compositions within a polymeric package (i.e., container). These packages can then be handled without contacting the tacky polymeric composition. The entire package can then be hot melt processed, for example in an extruder or similar mixing device, and coated to form a pressure sensitive adhesive layer. This layer contains not only the pressure sensitive adhesive polymer or composition, but also the remnants of the packaging material.

Often the remnants of the packaging material comprise polymeric particles. In systems where the pressure sensitive adhesive is not visible (such as with many tape constructions) or where the pressure sensitive adhesive need not have optical properties, the presence of polymeric particles is typically not an issue. However, if the particles are large enough to scatter visible light, that is to say larger than the wavelengths of light associated with the visible portion of the spectrum, and the polymeric particles are of a different refractive index than the pressure sensitive adhesive polymer or composition, the adhesive layer can scatter visible light. This scattering has the detrimental result of decreased visible light transmission and increased haze.

The need for adhesive layers with increasingly demanding optical properties, such as high visible light transmission and low haze, makes the desirable process of preparing of pressure sensitive adhesive polymers or compositions within a polymeric package and then hot melt processing and coating these packages to form an adhesive layer, appear to be unlikely to succeed.

Disclosed herein are packaged pre-adhesive compositions developed to permit the use of the desirable preparation of pressure sensitive adhesive polymers or compositions within a polymeric package and then hot melt processing and coating these packages to form an adhesive layer with desirable optical properties, such as high visible light transmission and/or low haze.

The packaged pre-adhesive composition includes packaging material and a polymerizable pre-adhesive reactive mixture sealed within the packaging material. The packaging material includes: a semicrystalline polylactic acid (PLA); a polyvinyl acetate (PVAc); and a plasticizer; wherein the PLA/PVAc-containing packaging material has a single $T_g$ of less than 25° C. and a normalized Haze value of less than 10% per 25 microns.

The polymerizable pre-adhesive reactive mixture polymerizes to form a pressure-sensitive adhesive upon exposure to an appropriate energy source. The packaging material is selected such that it does not substantially adversely affect the adhesive properties of the polymerized pressure sensitive adhesive. Also, the polymers of the packaging material and the adhesive compositions are selected to be similar in refractive indices. Thus, even if the remnants of the packaging material (e.g., packets or containers) present as particles are larger than the wavelength of visible light, the limitation of the mismatch of refractive indices between the adhesive polymer and the packaging remnant particles permits the generation of adhesive layers with desirable optical properties, such as high visible light transmission and/or low haze.

In certain embodiments, the PLA/PVAc-containing polymer particles (remnant particles of the packaging material) have a refractive index that is no more than ±0.02, or no more than ±0.01, of the refractive index of the polymer present in a major amount in the adhesive (e.g., a (meth)acrylate-based copolymer). In certain embodiments, the PLA/PVAc-containing polymer particles (remnant particles of the packaging material) have a refractive index that is no more than ±0.02, or no more than ±0.01, of the refractive index of the pre-adhesive composition within the packaging.

At least some of the particles have an average particle size that is larger than the wavelength of visible light.

In certain embodiments, the adhesive is optically transparent and includes a (meth)acrylate-based copolymer having a refractive index of at least 1.43 (as the polymer present in the major amount), and PLA-containing polymer particles.

In some embodiments, the PLA/PVAc-containing packaging material has a single $T_g$ of less than 25° C., less than 24° C., less than 23° C., less than 22° C., less than 21° C., or less than 20° C. In some embodiments, the PLA/PVAc-containing packaging material has a single $T_g$ of at least −5° C., at least −4° C., at least −3° C., at least −2° C., at least −1° C., or at least 0° C.

In some embodiments, the PLA/PVAc-containing packaging material has a Haze value normalized for the packaging thickness of less than 10% per 25 microns (1 mil), less than 5% per 25 microns, or less than 3% per 25 microns.

In some embodiments, the tensile elongation of the PLA/PVAc-containing packaging material is at least 100%, at least 150%, at least 200%, at least 250%, or at least 300%. In some embodiments, the tensile elongation is no greater than 600% or no greater than 500%. In some embodiments, the tensile elongation of the PLA/PVAc-containing packaging material is 250% to 500%.

In some embodiments, the tensile modulus of the PLA/PVAc-containing packaging material is typically at least 50 megapascals (MPa), at least 100 MPa, at least 150 MPa, at least 200 MPa, at least 250 MPa, or at least 300 MPa. In some embodiments, the tensile modulus is no greater than 1000 MPa, no greater than 750 MPa, or no greater than 500 MPa. In some embodiments, the tensile modulus of the PLA/PVAc-containing packaging material is 100 MPa to 500 MPa.

In some embodiments, the tensile strength of the PLA/PVAc-containing packaging material is typically at least 5 MPa or at least 10 MPa. In some embodiments, the tensile strength of the PLA/PVAc-containing packaging material is no greater than 50 MPa, no greater than 45 MPa, no greater than 40 MPa, no greater than 36 MPa, no greater than 34 MPa, no greater than 33 MPa, no greater than 32 MPa, no greater than 31 MPa, or no greater than 30 MPa. In some embodiments, the tensile strength of the PLA/PVAc-containing packaging material is 10 MPa to 45 MPa.

Polylactic Acid in Packaging Material

The packaging material described herein includes polylactic acid ("PLA") polymer. Lactic acid is a renewable material obtained by the bacterial fermentation of corn starch or cane sugar, and thus is considered a natural or in other words "biomass" material. Lactic acid has two optical isomers: L-lactic acid (also known as (S)-lactic acid) and D-lactic acid (also known as (R)-lactic acid), depicted as follows:

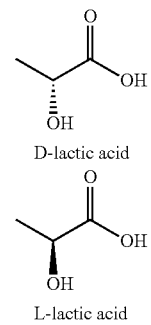

Polyesterification of lactic acid affords polylactic acid polymer.

More typically, lactic acid is converted to the cyclic lactide monomer, and the lactide undergoes ring opening polymerization, such as depicted as follows:

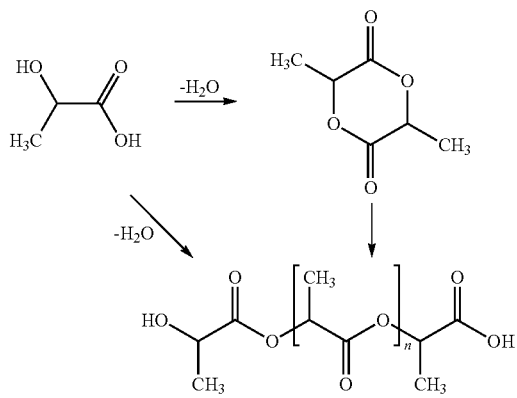

The resulting polymer material is typically referred to as polylactide polymer.

The degree of crystallinity is largely controlled by the ratio of D and/or meso-lactide to L cyclic lactide monomer used. Likewise, for polymers prepared by direct polyesterification of lactic acid, the degree of crystallinity is largely controlled by the ratio of polymerized units derived from D-lactic acid to polymerized units derived from L-lactic acid.

The packaging material described herein generally includes a semicrystalline PLA polymer alone or in combination with an amorphous PLA polymer. Both the semicrystalline and amorphous PLA polymers generally include high concentrations of polymerized units derived from L-lactic acid (e.g., L-lactide) with low concentrations of polymerized units derived from D-lactic acid (e.g., D-lactide).

The semicrystalline PLA polymer typically includes at least 90 wt-%, at least 91 wt-%, at least 92 wt-%, at least 93 wt-%, at least 94 wt-%, or at least 95 wt-% of polymerized units derived from L-lactic acid (e.g., L-lactide) and no greater than 10 wt-%, no greater than 9 wt-%, no greater than 8 wt-%, no greater than 7 wt-%, no greater than 6 wt-%, or no greater than 5 wt-% of polymerized units derived from D-lactic acid (e.g., D-lactide and/or meso-lactide). In yet other embodiments, the semicrystalline PLA polymer includes at least 96 wt-% of polymerized units derived from L-lactic acid (e.g., L-lactide) and less than 4 wt-%, less than 3 wt-%, or less than 2 wt-% of polymerized units derived from D-lactic acid (e.g., D-lactide and/or meso-lactide).

The packaging material may include an even lower concentration of polymerized units derived from D-lactic acid (e.g., D-lactide and/or meso-lactide) depending on the concentration of semicrystalline PLA polymer in the packaging material. For example, if the packaging material includes 15 wt-% of a semicrystalline PLA having 2 wt-% D-lactide and/or meso-lactide, the packaging material would include 0.3 wt-% D-lactide and/or meso-lactide. The packaging material may include no greater than 9 wt-%, no greater than 8 wt-%, no greater than 7 wt-%, no greater than 6 wt-%, no greater than 5 wt-%, no greater than 4 wt-%, no greater than 3 wt-%, no greater than 2 wt-%, no greater than 1.5 wt-%, no greater than 1.0 wt-%, no greater than 0.5 wt-%, no greater than 0.4 wt-%, no greater than 0.3 wt-%, no greater than 0.2 wt-%, or no greater than 0.1 wt-% polymerized units derived from D-lactic acid (e.g., D-lactide and/or meso-lactide). Suitable examples of semicrystalline PLA include that available from Natureworks, LLC (Minnetonka, Minn.) under the trade designation INGEO 4042D and 4032D. These polymers have been described in the literature as having a weight average molecular weight (Mw) of 200,000 grams per mole (g/mol), a number average molecular weight (Mn) of 100,000 g/mol, and a polydispersity of 2.0.

The packaging material may further include an amorphous PLA polymer blended with the semicrystalline PLA. The amorphous PLA typically includes no more than 90 wt-% of polymerized units derived from L-lactic acid and greater than 10 wt-% of polymerized units derived from D-lactic acid (e.g., D-lactide and/or meso-lactide). In some embodiments, the amorphous PLA includes at least 80 wt-% of polymerized units derived from L-lactic acid (e.g., L-lactide). In some embodiments, the amorphous PLA includes no greater than 20 wt-% of polymerized units derived from D-lactic acid (e.g., D-lactide and/or meso-lactide). A suitable amorphous PLA includes that available from Natureworks under the trade designation INGEO 4060D. This polymer has been described in the literature as having a molecular weight Mw of 180,000 g/mol.

The PLA polymers are preferably "film grade" polymers, having a melt flow rate (as measured according to ASTM D1238) of no greater than 25 grams per minute (g/min), no greater than 20 g/min, no greater than 15 g/min, or no greater than 10 g/min at 210° C. with a mass of 2.16 kilograms (kg). In some embodiments, the PLA polymer has a melt flow rate of less than 10 g/min or less than 9 g/min at 210° C. The melt flow rate is related to the molecular weight of the PLA polymer. The PLA polymer typically has an Mw (as determined by Gel Permeation Chromatography with polystyrene standards) of at least 50,000 g/mol, at least 75,000 g/mol, at least 100,000 g/mol, at least 125,000 g/mol, or at least 150,000 g/mol. In some embodiments, the Mw is no greater than 400,000 g/mol, no greater than 350,000 g/mol, or no greater than 300,000 g/mol.

The PLA polymers typically have a tensile strength of 25 MPa to 150 MPa; a tensile modulus of 1000 MPa to 7500 MPa; and a tensile elongation of at least 3%, at least 4%, or at least 5%, and ranging up to 15%. In some embodiments, the tensile strength of the PLA polymer is at least 30 MPa, at least 40 MPa, or at least 50 MPa. In some embodiments, the tensile strength of the PLA polymer is no greater than 125 MPa, no greater than 100 MPa, or no greater than 75 MPa. In some embodiments, the tensile modulus of the PLA polymer is at least 1500 MPa, at least 2000 MPa, or at least 2500 MPa. In some embodiments, the tensile modulus of the PLA polymer is no greater than 7000 MPa, no greater than 6500 MPa, no greater than 6000 MPa, no greater than 5500 MPa, no greater than 5000 MPa, or no greater than 4000 MPa. Such tensile and elongation properties can be determined by ASTM D882 and are typically reported by the manufacturer or supplier of such PLA polymers.

Suitable PLA polymers generally have a glass transition temperature ($T_g$) ranging from 50° C. to 65° C. (as can be determined by Differential Scanning calorimetry (DSC)).

Suitable semicrystalline PLA polymers typically have a melting point ranging from 140° C. to 175° C. The PLA polymer, typically including a semicrystalline PLA alone or in combination with an amorphous PLA polymer can be melt-processed at a temperature in a range of 180° C. to 230° C., such as temperatures of 180° C., 190° C., 200° C., 210° C., 220° C., or 230° C.

The packaging material typically includes a semicrystalline PLA polymer or a blend of semicrystalline and amorphous PLA polymers in an amount of at least 40 wt-%, at least 45 wt-%, or at least 50 wt-%, based on the total weight of the PLA/PVAc-containing packaging material (e.g., PLA polymer, polyvinyl acetate polymer, and plasticizer). The total amount of PLA polymer is typically no greater than 90 wt-%, no greater than 85 wt-%, no greater than 80 wt-%, no greater than 75 wt-%, or no greater than 70 wt-% of the total weight of the PLA/PVAc-containing packaging material.

Polyvinyl Acetate Polymer in Packaging Material

The packaging material further includes a polyvinyl acetate polymer. Suitable polyvinyl acetate polymers have a $T_g$ of at least 25° C., at least 30° C., at least 35° C., or at least 40° C. The $T_g$ of the polyvinyl acetate is typically no greater than 50° C. or no greater than 45° C.

The polyvinyl acetate polymer typically has an Mn or Mw (as determined by Size Exclusion Chromatography with polystyrene standards) of at least 50,000 g/mol, at least 75,000 g/mol, at least 100,000 g/mol, at least 125,000 g/mol, at least 150,000 g/mol, at least 175,000 g/mol, at least 200,000 g/mol, at least 225,000 g/mol, or at least 250,000 g/mol. In some embodiments, the Mw is no greater than 1,000,000 g/mol, no greater than 750,000 g/mol, no greater than 500,000 g/mol, no greater than 450,000 g/mol, no greater than 400,000 g/mol, no greater than 350,000 g/mol, or no greater than 300,000 g/mol. In some embodiments, the molecular weight of the polyvinyl acetate polymer is greater than the molecular weight of the PLA polymer(s). The polyvinyl acetate polymer may be characterized as having a viscosity in a 10 wt-% ethyl acetate solution at 20° C. of 10 mPa*s to 50 mPa*s.

The polyvinyl acetate polymer is typically a homopolymer; however, the polymer may include a relatively low concentration of repeat units derived from other comonomers, provided that the $T_g$ of the polyvinyl acetate polymer is within a range of 25° C. to 50° C. Other comonomers include, for example, acrylic monomers such as acrylic acid and methyl acrylate; and vinyl monomers such as vinyl chloride and vinyl pyrollidone; and ($C_2$-$C_8$)alkylene monomers, such as ethylene. The total concentration of repeat units derived from other comonomers of the polyvinyl acetate polymer is typically no greater than 10 wt-%, no greater than 9 wt-%, no greater than 8 wt-%, no greater than 7 wt-%, no greater than 6 wt-%, or no greater than 5 wt-%. In some embodiments, the concentration of repeat units derived from other comonomers of the polyvinyl acetate polymer is typically no greater than 4 wt-%, no greater than 3 wt-%, no greater than 2 wt-%, no greater than 1 wt-%, or no greater than 0.5 wt-%. The polyvinyl acetate polymer typically has a low level of hydrolysis. The polymerized units of the polyvinyl acetate polymer that are hydrolyzed to units of vinyl alcohol are generally no greater than 10 mol-%, no greater than 9 mol-%, no greater than 8 mol-%, no greater than 7 mol-%, no greater than 6 mol-%, no greater than 5 mol-%, no greater than 4 mol-%, no greater than 3 mol-%, no greater than 2 mol-%, no greater than 1 mol-%, or no greater than 0.5 mol-%, of the polyvinyl acetate polymer.

Polyvinyl acetate polymers are commercially available from various suppliers including Vinavil (Italy) under the trade designation VINAVIL. Prior to combining with the PLA, such polyvinyl acetate polymers are often in a solid powder (e.g., white powder) or colorless bead form. In some embodiments, the polyvinyl acetate polymer is not water redispersible.

A single polyvinyl acetate polymer may be utilized or a combinations of two or more polyvinyl acetate polymers may be utilized in making the PLA/PVAc-containing packaging material of the present disclosure.

The total amount of polyvinyl acetate polymer present in the packaging material described herein is typically at least about 10 wt-%, at least about 15 wt-%, or at least about 20 wt-%, based on the total weight of the PLA/PVAc-containing packaging material (e.g., PLA polymer, polyvinyl acetate polymer, and plasticizer). The total amount of polyvinyl acetate polymer present in the packaging material described herein is typically no greater than 50 wt-%, no greater than 45 wt-%, or no greater than 40 wt-%, based on the total weight of the PLA/PVAc-containing packaging material.

Plasticizer in Packaging Material

The packaging material includes a plasticizer. The total amount of plasticizer in the packaging material is typically at least 5 wt-%, based on total weight of PLA/PVAc-containing packaging material (e.g., PLA polymer, polyvinyl acetate polymer, and plasticizer). The total amount of plasticizer in the packaging material is typically up to 35 wt-%, up to 40 wt-%, up to 45 wt-%, or up to 50 wt-%, based on total weight of PLA/PVAc-containing packaging material. Various combinations of plasticizers may be utilized in packaging materials of the present disclosure.

Various plasticizers that are capable of plasticizing PLA have been described in the art. Suitable plasticizers are generally a liquid at 25° C. and typically have a molecular weight ranging from 200 g/mol to 10,000 g/mol. In some embodiments, the molecular weight of the plasticizer is no greater than 5,000 g/mol. In other embodiments, the molecular weight of the plasticizer is no greater than 4,000 g/mol, no greater than 3,000 g/mol, no greater than 2,000 g/mol, or no greater than 1,000 g/mol.

Suitable plasticizers generally lack aromatic groups and halogen atoms and are anticipated to be biodegradable. In some embodiments, suitable plasticizers include one or more ester or ether groups. Multi-functional esters and/or ethers may be used. Examples of suitable plasticizers include alkyl phosphate esters, dialkylether diesters, tricarboxylic esters, epoxidized oils and esters, polyesters, polyglycol diesters, alkyl alkylether diesters, aliphatic diesters, alkylether monoesters, citrate esters, dicarboxylic esters, vegetable oils, and esters of glycerine.

In some embodiments, suitable plasticizers include linear or branched alkyl terminal groups having a carbon chain length of $C_2$ to $C_{10}$.

In one embodiment, the plasticizer is a bio-based, citrate-based plasticizer represented by the following Formula (I):

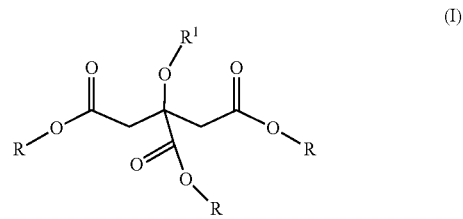

(I)

wherein:
each R is independently an alkyl group; and
R' is an H or an ($C_1$ to $C_{10}$)acyl group.

In some embodiments, each R is independently a linear or branched alkyl group having a carbon chain length of $C_1$ to $C_{10}$. In some embodiments, R is a ($C_2$ to $C_8$) or a ($C_2$ to $C_4$) linear alkyl group. In some embodiments, R' is acetyl. In some embodiments, at least one R is a branched alkyl groups having a carbon chain length of $C_5$ or greater. In some embodiments, the branched alkyl group has a carbon chain length no greater than 8.

Representative citrate-based plasticizers include, for example, triethyl citrate, acetyl triethyl citrate, tributyl citrate, acetyl tributyl citrate, trihexyl citrate, acetyl trihexyl citrate, trioctyl citrate, acetyl trioctyl citrate, butyryl trihexyl citrate, acetyl tris-3-methylbutyl citrate, acetyl tris-2-methylbutyl citrate, acetyl tris-2-ethylhexyl citrate, and acetyl tris-2-octyl citrate.

In some embodiments, the plasticizers include a polyethylene glycol backbone and ester alkyl terminal groups. The molecular weight of the polyethylene glycol segment is typically at least 100 g/mol, at least 150 g/mol, or at least 200 g/mol, and typically no greater than 1,000 g/mol. In some embodiments, the polyethylene glycol segment has a molecular weight of no greater than 900 g/mol, no greater than 800 g/mol, no greater than 700 g/mol, or no greater than 600 g/mol.

In some embodiments, the plasticizer compound typically has little or no hydroxyl groups. In some embodiments, the weight percent of hydroxyl groups relative to the total weight of the plasticizer compound is no greater than 10 wt-%, no greater than 9 wt-%, no greater than 8 wt-%, no greater than 7 wt-%, no greater than 6 wt-%, no greater than 5 wt-%, no greater than 4 wt-%, no greater than 3 wt-%, no greater than 2 wt-%, or no greater than 1 wt-%. In some embodiments, the plasticizer compound contains no hydroxyl groups. Thus, in this embodiment, the plasticizer is not glycerol or water.

Other Optional Additives in Packaging Material

To facilitate the rate of crystallization, a nucleating agent may also be present in the PLA/PVAc-containing packaging material. Suitable nucleating agent(s) include, for example, inorganic minerals, organic compounds, salts of organic acids and imides, finely divided crystalline polymers with a melting point above the processing temperature of PLA, and combinations of two or more of the foregoing. Suitable nucleating agents typically have an average particle size of at least 25 nanometers, or at least 0.1 micron. Combinations of two or more different nucleating agents may also be used.

Examples of useful nucleating agents include, for example, talc (hydrated magnesium silicate —$H_2Mg_3(SiO_3)_4$ or $Mg_3Si_4O_{10}(OH)_2$), silica ($SiO_2$), titania ($TiO_2$), alumina ($Al_2O_3$), zinc oxide, sodium salt of saccharin, calcium silicate, sodium benzoate, calcium titanate, aromatic sulfonate derivative, boron nitride, copper phthalocyanine, phthalocyanine, sodium salt of saccharin, isotactic polypropylene, polybutylene terephthalate, and the like.

When an organic nucleating agent is present, it is typically present at a concentration of at least 0.01 wt-%, at least 0.02 wt-%, at least 0.03 wt-%, at least 0.04 wt-%, at least 0.05 wt-%, at least 0.1 wt-%, at least 0.15 wt-%, or at least 0.2 wt-%, based on the total weight of the PLA/PVAc-containing packaging material. When an organic nucleating agent is present, it is typically present at a concentration of up to 1 wt-%, up to 2 wt-%, up to 3 wt-%, up to 4 wt-%, or up to 5 wt-%, based on the total weight of the PLA/PVAc-containing packaging material.

When the nucleating agent is an inorganic oxide filler, such as silica, alumina, zinc oxide, and talc, the concentration can be higher.

In one embodiment, the nucleating agent may be characterized as a salt of a phosphorous-containing aromatic organic acid, such as zinc phenylphosphonate, magnesium phenylphosphonate, disodium 4-tert-butylphenyl phosponate, and sodium diphenylphosphinates.

One favored nucleating agent is zinc phenylphosphonate having the following chemical formula:

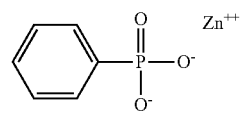

available from Nissan Chemical Industries, Ltd. under the trade designation ECOPROMATE.

In some embodiments, inorganic fillers may be used to prevent blocking or sticking of layers or rolls of the film during storage and transport. Inorganic fillers include clays and minerals, either surface modified or not. Examples include talc, diatomaceous earth, silica, mica, kaolin, titanium dioxide, perlite, and wollastonite.

The packaging material of the present disclosure may optionally contain one or more conventional additives. Additives include, for example, antioxidants, stabilizers, ultraviolet absorbers, lubricants, processing aids, antistatic agents, perfumes, impact resistance aids, fillers, matting agents, flame retardants (e.g., zinc borate), pigments, dyes, fillers, slip agents, antiblock agents, microwave susceptors, thermally conductive particles, electrically conductive particles, and/or other materials to increase the flexibility, handleability, visibility, or other useful property of the film, as long as they do not adversely affect the desired properties of the adhesive composition.

Preparation of Packaging Material

In some embodiments, the packaging material of the present disclosure is a film having a thickness of at least 10 microns, at least 15 microns, at least 20 microns, or at least 25 microns (1 mil). In some embodiments, the packaging material of the present disclosure is a film having a thickness of up to 500 microns (20 mils), up to 400 microns, up to 300 microns, up to 200 microns, up to 150 microns, or up to 50 microns. A thinner film may be in the form of a roll-good. The packaging material may be in the form of a monolayer or multilayer film.

In preparing a packaging material as described herein, the PLA, PVAc, plasticizer, and optional components such as nucleating agent, etc., are heated to a temperature of, for example, 180° C. to 250° C. and thoroughly mixed using any suitable means known by those of ordinary skill in the art. For example, the packaging material may be mixed by use of a (e.g., Brabender) mixer, extruder, kneader, or the like.

Following mixing, the packaging material may be formed (e.g., cast) into a film using known film-forming techniques, taking into consideration the scale of the process and available equipment. In some embodiments, the PLA/PVAc-containing packaging material is transferred to a press and then compressed and solidified to form individual sheets of PLA-containing film. In other embodiments, the PLA/PVAc-containing packaging material may be extruded through a die onto a casting roll maintained at a suitable cooling temperature to form a continuous length of PLA-containing film. In some embodiments, during the film extrusion, the casting roll temperature is maintained preferably at 80° C. to 120° C. to obtain crystallization of PLA films on the casting roll.

Adhesive Compositions

In certain embodiments, adhesive compositions disclosed herein are optically transparent and include a (meth)acrylate-based copolymer having a refractive index of at least 1.43, PLA/PVAc-containing particles, at least some of the particles having an average particle size that is larger than the wavelength of visible light. The adhesive composition may also contain other optional additives. These optically transparent compositions typically have a visible light transmission of greater than 85%. In some embodiments optically transparent compositions have a visible light transmission of greater than 90%. In addition, these optically transparent compositions typically have a haze value of less than 10%, and in some embodiments less than 5%.

In some embodiments of this disclosure, the adhesive composition is optically clear. In certain embodiments, optically clear compositions generally have visible light transmission of greater than 90%, and a haze of less than 5%. In some embodiments, the optically clear compositions may have a visible light transmission of at least 95% and/or a haze value of less than 2%.

Visible light transmission and haze can be measured using well understood optical techniques. For example, visible light transmission and haze can be measured with a BYK Gardner Spectrophotometer using the techniques described in the test method ASTM D1003. The optical properties of the adhesive composition, such as whether the adhesive composition is optically transparent or optically clear, can depend on wide variety of parameters. Among these parameters are: the composition of the (meth)acrylate-based polymer; the composition of the PLA/PVAc-containing particles; the presence or absence of optional additives; the processing conditions used to prepare the adhesive composition; and so forth.

The desired optical properties can be different for different applications and intended uses, and thus, a variety of different adhesive compositions with different optical properties can be suitable. For example, for some applications, optically transparent adhesive compositions are suitable, whereas for other applications, optically clear adhesive compositions are necessary.

The (meth)acrylate-based copolymer having a refractive index of at least 1.43 is prepared from a variety of (meth)acrylate monomers, and may also contain other free radically polymerizable monomers. In some embodiments, the refractive index of the (meth)acrylate-based copolymer is at most 1.49. The refractive index of the (meth)acrylate-based copolymer is one of the parameters used to control the final properties of the adhesive compositions of this disclosure and therefore a variety of refractive indices of at most 1.49 are included in this disclosure.

PLA/PVAc-containing particles may be of a wide range of sizes and shapes, as long as at least some particles have an average particle size that is larger than the wavelength of visible light. Because the particles are formed from the hot melt processing of a packaging material (e.g., packets or containers) that have been prepared from films, the sizes, shapes, as well as the range of sizes and shapes can be largely dependent upon the hot melt processing conditions.

In some embodiments, at least some of the particles are relatively large. The particles can have a variety of shapes, but typically they are longer in one dimension and narrower in the other two dimensions, roughly needle-shaped. In some embodiments, the particles may be 1 micrometer or even longer in the longest dimension. In some embodiments, the particles may be up to 5 micrometers in the longest dimension. Various techniques can be used to determine the dimensions of the particles such as electron microscopy or optical microscopy.

Polymerizable Pre-Adhesive Reactive Mixtures

In certain embodiments, the polymerizable pre-adhesive reactive mixture forms a polymerized acrylate pressure-sensitive adhesive that is optically clear.

The polymerizable pre-adhesive reactive mixture is typically a (meth)acrylate-containing composition that includes acrylates and methacrylates as well as acrylamides and methacrylamides including monomers, oligomers, and polymers. Such materials may include (meth)acrylate-functional materials wherein such functional groups are terminal or pendant groups on a backbone derived from a polyester, epoxy, or polyurethane, for example.

Examples of suitable optically clear pre-adhesive compositions are described in U.S. Patent Pub. Nos. 2007/0092733 (Yang et al.), 2009/0087629 (Everaerts et al.), and 2010/0086705 (Everaerts et al.).

Examples of (meth)acrylate monomers include (meth)acrylic ester monomers (i.e., (meth)acrylic acid ester monomers or (meth)acrylate monomers), polar monomers, and other optional monomers.

The (meth)acrylate monomers can include aliphatic and cycloaliphatic groups. Useful (meth)acrylates (i.e., (meth)acrylic acid alkyl ester monomers) include linear or branched monofunctional acrylates or methacrylates of non-tertiary alkyl alcohols, the alkyl groups of which have from 1 up to 22 and, in particular, from 1 up to 18 carbon atoms. Useful monomers include, for example, 2-ethylhexyl (meth)acrylate, ethyl (meth)acrylate, methyl (meth)acrylate, n-propyl (meth)acrylate, isopropyl (meth)acrylate, pentyl (meth)acrylate, n-octyl (meth)acrylate, isooctyl (meth)acrylate, isononyl (meth)acrylate, n-butyl (meth)acrylate, isobutyl (meth)acrylate, hexyl (meth)acrylate, n-nonyl (meth)acrylate, isoamyl (meth)acrylate, n-decyl (meth)acrylate, isodecyl (meth)acrylate, dodecyl (meth)acrylate, isobornyl (meth)acrylate, cyclohexyl (meth)acrylate, isostearyl (meth)acrylate, behenyl (meth)acrylate, iso-octadecy (meth)acrylate, and 2-methylbutyl (meth)acrylate, and combinations thereof.

For certain embodiments, suitable (meth)acrylic ester monomers include, but are not limited to, those selected from the group consisting of the esters of acrylic acid or methacrylic acid with non-tertiary alkyl alcohols such as 1-butanol, 1-pentanol, 2-pentanol, 3-pentanol, 2-methyl-1-butanol, 1-methyl-1-butanol, 1-methyl-1-pentanol, 2-methyl-1-pentanol, 3-methyl-1-pentanol, 2-ethyl-1-butanol, 2-ethyl-1-hexanol, 3,5,5-trimethyl-1-hexanol, 3-heptanol, 2-octanol, 1-decanol, 1-dodecanol, and the like, and mixtures thereof. Polar monomers include free-radically copolymerizable monomers such as acrylic monomers containing hydroxyl, carboxylic acid, amide, urethane, or urea functional groups.

Useful carboxylic acids include acrylic acid and methacrylic acid.

Monomers like N-vinyllactams may also be included.

Useful amides include N-vinyl caprolactam, N-vinyl pyrrolidone, (meth)acrylamide, N-methyl (meth)acrylamide, N,N-dimethyl meth(acrylamide), N-isopropyl (meth)acrylamide and N-octyl (meth)acrylamide.

Optional Additives in the Adhesives

The pre-adhesive reactive mixtures and the resultant adhesive compositions may also include a variety of optional additives as long as the additives do not interfere with the desired optical and adhesive properties of the adhesive composition. Examples of suitable additives include tackifiers, plasticizers, and other performance enhancement additives.

Various combinations of such additives can be used in the adhesive compositions described herein. Additionally, for optical applications, tackifiers, plasticizers, and other additives should have low color (i.e. a Gardner value of greater than 3, more typically greater than 1).

Examples of useful tackifiers include, but are not limited to, rosin, rosin derivatives, polyterpene resins, coumarone-indene resins, and the like. Plasticizers which may be added to the adhesive may be selected from a wide variety of commercially available materials. Representative plasticizers include polyoxyethylene aryl ether, dialkyl adipate, 2-ethylhexyl diphenyl phosphate, t-butylphenyl diphenyl phosphate, di-(2-ethylhexyl) adipate, toluenesulfonamide, dipropylene glycol dibenzoate, polyethylene glycol dibenzoate, polyoxypropylene aryl ether, dibutoxyethoxyethyl formal, di-isooctyl phthalate, and dibutoxyethoxyethyl adipate.

When used, tackifiers are preferably added in an amount not to exceed about 50 parts by weight per 100 parts by weight copolymer, and plasticizer may be added in an amount up to about 50 parts by weight per 100 parts by weight copolymer.

Other additives can be added in order to enhance the performance of the adhesive compositions. Examples of such performance enhancing additives include leveling agents, ultraviolet light absorbers, hindered amine light stabilizers (HALS), oxygen inhibitors, wetting agents, rheology modifiers, defoamers, biocides, dyes, pigments, and the like. All of these additives and the use thereof are well known in the art. It is understood that any of these compounds can be used so long as they do not deleteriously affect the adhesive and optical properties.

Among the particularly useful additives are UV absorbers and hindered amine light stabilizers (HALS). UV absorbers and hindered amine light stabilizers act to diminish the harmful effects of UV radiation on the adhesive composition and thereby enhance the weatherability, or resistance to cracking, yellowing and delamination of coatings prepared from the adhesive compositions. A suitable HALS is bis(1, 2,2,6, 6-pentamethyl-4-piperidinyl) [3,5-bis(1,1-dimethylethyl-4-hydroxyphenyl)methyl]butylpropanedioate, available as TINUVIN 144, from CIBA-GEIGY Corporation, Hawthorne, N.Y.

The following UV absorbers and combinations thereof in concentrations of less than 5 parts by weight based on the total monomer composition, may produce desirable results, with concentrations in the range of 1-5 parts by weight based on the total monomer composition being particularly suitable: bis(1,2,2,6,6-pentamethyl-4-piperidinyl)(3,5-bis(1,1-dimethylethyl 1-4-hydroxyphenyl)methyl) butylpropanedioate, 2-ethylhexyl-2-cyano-3,3'-diphenylacrylate, 2-hydroxyl-4-n-octoxybenzophenone, 2-(2'-hydroxy-5'-methylphenyl)benzotriazole, poly(oxy-1,2-ethanediyl), alpha-(3-(3-(2H-benzotriazol-2-yl)-5-(1,1-dimethylethyl)-4-hydroxylphenyl)-1-oxopropyl)-omega-hydroxy, and UVINUL D-50 and UVINUL MS-40, sold by BASF Wyandotte Inc., Parsippany, N.J.

Additionally, the adhesive composition may also contain particles other than those that result from the PLA/PVAc-containing packaging material, as long as the particles do not interfere with the desired optical properties of the adhesive composition. Particularly suitable are particles that do not scatter visible light but absorb light of one wavelength and re-emit the light at a different wavelength. Examples of such particles include the phosphor particles described in U.S. Pat. No. 7,294,861 (Schardt et al.).

Packaging of the Pre-Adhesive Reactive Mixtures

The packaging material includes a semicrystalline polylactic acid (PLA); a polyvinyl acetate (PVAc); and a plasticizer; wherein the PLA/PVAc-containing packaging material has a single $T_g$ of less than 25° C. and a normalized Haze value of less than 10% per 25 microns. The PLA/PVAc-containing packaging material is a thermoplastic material that generally melts at or below the processing temperature of the polymerized pre-adhesive mixture (in other words, the temperature at which the polymerized pre-adhesive mixture flows). The packaging material generally has a melting point of 200° C. or less, or 170° C. or less. In some embodiments the melting point ranges from 140° C. to 160° C.

The amount of packaging material relative to the amount of the pre-adhesive reactive mixture depends upon the type of material and the desired end properties. The amount of packaging material typically is at least 0.5 wt-%, at least 2 wt-%, or at least 3 wt-%, based on the total weight of the pre-adhesive reactive mixture and the packaging material. The amount of packaging material typically is up to 20 wt-%, up to 15 wt-%, up to 10 wt-%, up to 7 wt-%, or up to 5 wt-%, based on the total weight of the pre-adhesive reactive mixture and the packaging material. Typically, the packaging material is from 2 wt-% to 15 wt-%, and more typically from 3 wt-% to 5 wt-%.

Analogously, in the final adhesive composition, the amount of PLA/PVAc polymer particles typically is at least 0.5 wt-%, at least 2 wt-%, or at least 3 wt-%, based on the total weight of the adhesive composition. The amount of PLA/PVAc polymer particles typically is up to 20 wt-%, up to 15 wt-%, up to 10 wt-%, up to 7 wt-%, or up to 5 wt-%, based on the total weight of the adhesive composition. Typically, the packaging material is from 2 wt-% to 15 wt-%, and more typically from 3 wt-% to 5 wt-%.

Methods of preparing packaged adhesive compositions are similar to those described in U.S. Pat. No. 6,294,249 (Hamer et al.), and International Pub. Nos. WO 97/033945 and WO 2014/105584. In this method, a polymerizable pre-adhesive reactive mixture is prepared. The polymerizable pre-adhesive reactive mixture includes the desired monomer(s) and may also include a mixture of free radically polymerizable comonomers, a polymerization initiator, and optional additives. This mixture can be prepared and mixed in any suitable mixing apparatus.

The pre-adhesive composition is "sealed" within the packaging material. By this, it is meant that the pre-adhesive composition is substantially surrounded with the PLA/PVAc-containing packaging material or completely surrounded with the packaging material. In certain embodiments, the PLA/PVAc-containing packaging material is in the form of individual packages (e.g., packets or containers). It is noted that random variations in production may produce occasional packaged pre-adhesives in which the pre-adhesive composition is not completely surrounded with the packaging material. The PLA/PVAc-containing packaging material may be in the form of a strip of individual packages or in the form of individual sheets that are heat sealed around the edges to form a package.

In the practice of one embodiment of the disclosure, two lengths of PLA-containing film are heat sealed together across the bottom and on each of the lateral edges on a liquid form-fill-seal machine to form an open ended package. The pre-adhesive composition is pumped through a hose to fill the package, and the package is then heat sealed across the top to completely surround the adhesive composition. Preferably, the form-fill-seal machine is equipped with an impulse sealer to form the top and bottom seal across the packages. Such a sealer has one or two sets of jaws that clamp the package shut before sealing. A sealing wire is then heated to effect the seal, and the seal is cooled before the jaws are released. The sealing temperature is generally above the softening point and below the melting point of the film used to form the package.

During the sealing process, it is desirable to get most of the air out of the package before sealing. A small amount of air is tolerable so long as the amount of oxygen is not sufficient to substantially interfere with the polymerization process. For ease of handling, it is desirable to seal the packages as soon as they are filled with the composition, although immediate sealing is not necessary in all cases. In some cases the pre-adhesive composition can alter the PLA/PVAc-containing packaging material, and it is desirable to cross-seal the packages within about one minute of filling, more preferably within 30 seconds, and most preferably within 15 seconds. If the pre-adhesive composition decreases the strength of the PLA/PVAc-containing packaging material, it is preferable to polymerize the composition as soon as possible after the pre-adhesive composition is surrounded by the packaging material.

Alternatively, a single length of film can be folded lengthwise and sealed on one edge, filled with the pre-adhesive composition, and sealed. In another embodiment, a single length of film can be pulled through a forming collar, sealed to form a tube, filled with the composition, and sealed. Another embodiment can be carried out on commercial liquid form-fill-seal machines. A source of such machines is the Packaging Machinery Division of Eagle Corp. It is contemplated that the seals can be effected in any of a number of different configurations to form multiple packages across and down the lengths of film. For example, in addition to the seals on the lateral edges, a seal can also be formed down the center of the lengths of film so that a cross seal will form two filled packages. The packages can either be left attached to each other by the cross seals and/or vertical seals, or they can be cut into individual packages or strands of packages. The packages may each contain the same or different compositions.

Preparation of Pressure-Sensitive Adhesives

The packaged pre-adhesive compositions disclosed herein are exposed to transmissive energy to polymerize the polymerizable pre-adhesive reactive mixture contained therein.

The transmissive energy may be selected from ultraviolet radiation, visible radiation, thermal radiation, or thermal conduction. The transmissive energy is preferably ultraviolet radiation or thermal conduction. Preferably, at least 80 percent of the pre-adhesive is converted to adhesive; more preferably, at least 90 percent of the pre-adhesive is converted to adhesive.

Thermal polymerization can be effected by immersing the packaged composition in a heat exchange medium at temperatures of 40° C. to 100° C. for a time sufficient to polymerize the packaged pre-adhesive reactive mixture. The heat exchange medium may be a forced or impinged gas or a liquid such as water, perfluorinated liquids, glycerine, or propylene glycol. The heat necessary for thermal polymerization may also be provided by a metal platen, heated metal rolls, or microwave energy. The temperature at which the polymerization occurs depends upon the activation temperature of the initiator and would be readily ascertained by one of skill in the art. It is preferable to carry out the polymerization in an appropriate liquid heat exchange medium at a controlled temperature. A suitable liquid heat exchange medium is water, heated to the desired reaction temperature.

Polymerization can also be effected by exposure to ultraviolet (UV) radiation as described in U.S. Pat. No. 4,181,752 (Martens et al.). In a preferred embodiment, polymerization is carried out with UV black lights having over 60 percent, and preferably over 75 percent of their emission spectra in a range of 280 to 400 nanometers (nm), with an intensity between about 0.1 to about 25 mW/cm$^2$.

During photopolymerization it is desirable to control the temperature by blowing cooling air around the packaged pre-adhesive composition, by running the packaged pre-adhesive composition over a cooled platen, or by immersing the packaged pre-adhesive composition in a water bath or a heat transfer fluid during polymerization. In certain embodiments, the packaged pre-adhesive compositions are immersed in a water bath, with water temperatures of 5° C. to 90° C., or below 30° C. Agitation of the water or fluid helps to avoid hot spots during the reaction.

In a preferred embodiment, after exposing the polymerizable pre-adhesive reactive mixture to transmissive energy and allowing polymerization of the pre-adhesive reactive mixture to occur, at least a portion of the pre-adhesive reactive mixture has been converted to an adhesive which comprises at least one polymer with a weight average molecular weight of at least 50,000 g/mol.

Upon completion of the polymerization, a packaged adhesive composition is generated. This packaged adhesive composition can be used immediately, stored for later use, or shipped to a different location for hot melt processing. Because the viscoelastic adhesive composition is contained within a package, handling and storage is greatly simplified.

The polymerized adhesive compositions may be used to make a coatable thermoplastic or thermosettable hot melt adhesive by introducing the adhesive and its PLA/PVAc-containing packaging material into a vessel in which the adhesive and its PLA/PVAc-containing packaging material are melted. The PLA/PVAc-containing packaging material does not substantially adversely affect the adhesive characteristics of a hot melt coated mixture of the adhesive and the PLA/PVAc-containing packaging material. This hot melt adhesive may be used to form a pressure sensitive adhesive sheet by coating the melted adhesive and its PLA/PVAc-containing packaging material onto a sheet material or another suitable substrate. The sheet material is preferably selected from a tape backing or a release liner. In one embodiment of the disclosure, the coated pressure sensitive adhesive is optically clear and has a low haze value (e.g., below 2.0).

Preferably, the polymerized adhesives are hot melt coated by putting the packaged adhesive in a hot melt coater at a temperature sufficient to melt the packaged adhesive and with sufficient mixing to form a coatable mixture, which is coated onto a substrate. This step can be done conveniently in a heated extruder, bulk tank melter, melt-on-demand equipment, or a hand-held hot melt adhesive gun. If a crosslinking agent is added, the coated adhesive can then be exposed to sufficient UV radiation or ionizing radiation to effect the crosslinking. Crosslinking is preferably initiated after coating.

The steps may be done in-line, (i.e., the pre-adhesive reactive mixture may be surrounded by the PLA/PVAc-containing packaging material, polymerized, hot melt coated to form a tape, and optionally crosslinked), or the steps may be performed individually at separate times and sites. For example, the packaged pre-adhesive reactive mixture may be polymerized at one time, and extruded and crosslinked at another time.

A variety of hot melt mixing techniques using a variety of hot melt mixing equipment are suitable for processing the packaged adhesive compositions. Both batch and continuous mixing equipment may be used. Examples of batch methods include those using a BRABENDER (e.g., a BRABENDER PREP CENTER, commercially available from C.W. Brabender Instruments, Inc., (South Hackensack, N.J.)), or BANBURY internal mixing and roll milling equipment (e.g., equipment available from Farrel Co., Ansonia, Conn.). Examples of continuous methods include single screw extruding, twin screw extruding, disk extruding, reciprocating single screw extruding, and pin barrel single screw extruding. Continuous methods can utilize distributive elements, pin mixing elements, static mixing elements, and dispersive elements such as MADDOCK mixing elements and SAXTON mixing elements. A single hot melt mixing apparatus may be used, or a combination of hot melt mixing equipment may be used to process the packaged adhesive compositions of this disclosure.

The output of the hot melt mixing is coated onto a substrate to form an adhesive layer. If a batch apparatus is used, the resulting hot melt blend can be removed from the apparatus and placed in a hot melt coater or extruder and coated onto a substrate. If an extruder is used to prepare a hot melt blend, the blend can be directly extruded onto a substrate to form an adhesive layer in a continuous forming method. In the continuous forming method, the adhesive can be drawn out of a film die and subsequently contacted to a moving plastic web or other suitable substrate. If the adhesive is to be part of a tape, the substrate may be a tape backing. In some methods, the tape backing material is coextruded with the adhesive from a film die and the multilayer construction is then cooled to form the tape in a single coating step. If the adhesive is to be a transfer tape, the adhesive layer may be a free standing film and the substrate may be a release liner or other releasing substrate. After forming, the adhesive layer or film can be solidified by quenching using both direct methods (e.g., chill rolls or water batch) and indirect methods (e.g., air or gas impingement).

If it is desired to crosslink the pressure sensitive adhesive layer, the adhesive layer can be subjected to a crosslinking process. If a photosensitive crosslinker is present, such as those described above, the adhesive layer can be exposed to high intensity UV lamps to effect crosslinking. If no crosslinker is present, crosslinking may be achieved by exposing the adhesive layer to high-energy electromagnetic radiation such as gamma or e-beam radiation.

Articles

Also disclosed herein are articles comprising a substrate and an adhesive disposed on at least a portion of the substrate. The adhesive comprises a (meth)acrylate-based copolymer having a refractive index of at least 1.43, and PLA/PVAc-containing particles, at least some of the particles having an average particle size that is larger than the wavelength of visible light. The adhesive may be optically transparent or optically clear.

A wide variety of substrates are suitable for use in the articles of this disclosure. Because of the desirable optical properties of the adhesive, frequently the substrate is an optical substrate. As used herein, the term "optical substrate" refers to a substrate that can be used to produce an optical effect. The substrate can be rigid, semi-rigid, or flexible. The substrate can be any suitable thickness. The optical substrates often are at least partially transmissive, reflective, antireflective, polarizing, optically clear, or diffusive with respect to some wavelengths of the electromagnetic spectrum (e.g., wavelengths in the visible, ultraviolet, or infrared regions of the electromagnetic spectrum). Exemplary optical substrates include, but are not limited to, plates, sheets, the surfaces of optical articles, and films.

Examples of optically clear rigid and semi-rigid substrates include plates, sheets, the surfaces of articles, and the like. The rigid or semi-rigid substrate may be optically clear, optically transparent or non-transparent. Examples of non-transparent substrates include ones that are reflective scattering elements.

Examples of plates include a wide array of optically clear materials. Examples of suitable plates include a variety of glasses or polymeric materials such as polycarbonate or polymethyl methacrylate. The plates may be in a variety of thickness and may be flat or curved. In some embodiments, the plate may also comprise additional layers or treatments. Examples of additional layers include, for example, additional layers of film designed to provide tinting, shatter resistance and the like. Examples of additional treatments that may be present include, for example, coatings or various types such as hardcoats.

Sheets are similar to plates but generally are thinner and less rigid than plates. Examples of sheets include, for example, optically clear semi-rigid substrates of glass or other optically clear materials that are 25 to 100 micrometers in thickness.

Examples of substrates that are the surface of an article include, but are not limited to, the outer surface of an electronic display such as liquid crystal display or a cathode ray tube, an electronic device such as a touch screen, an appliance such as a microwave oven (e.g., the time/button display), the outer surface of a window or glazing, the outer surface of an optical component such as a reflector, polarizer, diffraction grating, mirror, lens, or the like.

The substrate can contain polymeric materials, glass materials, ceramic materials, metal-containing materials (e.g., metals or metal oxides), or a combination thereof. Representative examples of polymeric materials include polycarbonates, polyesters (e.g., polyethylene terephthalates and polyethylene naphthalates), polyurethanes, poly(meth) acrylates (e.g., polymethyl methacrylates), polyvinyl alcohols, polyolefins such as polyethylenes and polypropylenes, polyvinyl chlorides, polyimides, cellulose triacetates, acrylonitrile-butadiene-styrene copolymers, and the like.

The substrate may be a reflective scattering element. Reflective scattering elements are ones that exhibit diffuse or semi-specular reflection. Diffuse and semi-specular reflections involve the reflection of light from a surface such that an incident ray is reflected at many angles rather than at just one angle as in specular reflection.

A wide array of materials can be used to prepare reflective scattering elements, such as plaster, paper, fibrous materials such as cloth and non-woven fiber mats, inorganic filled reflective polymers, ceramic materials, crystalline surfaces, and voided polymeric materials. Examples of reflective scattering elements include graphics such as signs, markings or pictures; rough reflective surfaces of metals such as brushed aluminum and chrome; coated surfaces such as painted, printed, or ink-coated surfaces.

Examples of flexible optical substrates include a wide array of optical films. As used herein, the term "optical film" refers to a film that can be used to produce an optical effect. The optical films are typically polymer-containing films that can be a single layer or multiple layers. The optical films can be of any suitable thickness. The optical films often are at least partially transmissive, reflective, antireflective, polarizing, optically clear, or diffusive with respect to some wavelengths of the electromagnetic spectrum (e.g., wavelengths in the visible, ultraviolet, or infrared regions of the electromagnetic spectrum). Exemplary optical films include, but are not limited to, visible mirror films, color mirror films, solar reflective films, diffusive films, infrared reflective films, ultraviolet reflective films, reflective polarizer films such as brightness enhancement films and dual brightness enhancement films, absorptive polarizer films, optically clear films, tinted films, dyed films, privacy films such as light-collimating films, and anti-reflective films, anti-glare films, soil resistant films, and anti-fingerprint films.

In some embodiments the optical film has a coating. In general, coatings are used to enhance the function of the film or provide additional functionality to the film. Examples of coatings include, for example, hardcoats, anti-fog coatings, anti-scratch coatings, privacy coatings, anti-fingerprint coatings, antimicrobial coatings or a combination thereof. Coatings such as hardcoats, anti-fog coatings, and anti-scratch coatings that provide enhanced durability, are desirable in applications such as, for example, touch screen sensors, display screens, graphics applications and the like. Examples of privacy coatings include, for example, blurry or hazy coatings to give obscured viewing or louvered films to limit the viewing angle. Examples of anti-fingerprint coatings include those described in U.S. Pat. No. 8,742,022 (Pokorny et al.), which describes coatings prepared from a curable resin and a non-ionic surfactant. Examples of anti-microbial coatings include those described in U.S. Pat. No. 8,124,169 (Ylitalo et al.), which describe an antimicrobial coating system that includes a film-forming composition and an effective amount of an antimicrobial agent dispersed within the film-forming composition.

Some optical films have multiple layers, such as multiple layers of polymer-containing materials (e.g., polymers with or without dyes) or multiple layers of metal-containing material and polymeric materials. Some optical films have alternating layers of polymeric material with different refractive indices. Other optical films have alternating polymeric layers and metal-containing layers. Exemplary optical films are described in the following patents: U.S. Pat. No. 6,049,419 (Wheatley et al.); U.S. Pat. No. 5,223,465 (Ueki et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.), and U.S. Pat. No. 5,360,659 (Arends et al.).

In some embodiments, the optical film comprises a multilayer paint protection film suitable for use with automobiles and other related uses. Examples of suitable films include those described, for example, in U.S. Patent Publication No. 2008/0199704 (Ho et al.). These multilayer films contain polyurethanes that are lightly crosslinked but are not thermosets. These multilayer films are typically transparent, and possibly even translucent, for paint protection applications, or even opaque for other surface protection or enhancement applications.

For some applications, it may be desirable for the multilayer film to be colored. When used as a paint protection film, it is often desirable for the multilayer film to be sized and shaped to conform to the surface to be protected, before the film is applied. Pre-sized and shaped pieces of the multilayer film can be commercially desirable for protecting the painted surface of various body parts of a vehicle such as, for example, an automobile, aircraft, watercraft, etc., especially those portions of the vehicle body (e.g., the leading edge of the front hood and other leading surfaces, rocker panels, etc.) that are exposed to such hazards as flying debris (e.g., sand, rocks, etc.), insects, or the like.

Particularly suitable articles are those where the substrate comprises a film, a tape backing, a graphic article, a light guide, a plastic article, a wound dressing, a protection film or tape, a light extraction layer, a keypad or membrane switch, a heat shrinkable layer or substrate, a display, a touch sensor, or a moldable film.

Other articles include a tape. Typical tape backings include cellulosic materials such as paper, crepe paper, and cloth (including both woven and non-woven cloths); films such as biaxially oriented polyester, polyvinyl chloride, polyurethane, biaxially and monoaxially oriented polypropylene, nylon; foam materials such as polyethylene foams and acrylic foams; and metal foils such as aluminum foil. The backings are usually treated on the back side with a release coating such as silicone, and may be treated prior to hot melt coating to enhance the adhesion of the adhesive to the backing. Treatments useful for enhancing the adhesion of the adhesive to the backing include chemical priming and corona treatment.

In another embodiment, a transfer tape can be formed wherein the substrate is a release liner. The release liner can be coated on one or both sides with a release coating, and the transfer tape is removed from the substrate when used by the end user.

Additionally, the adhesive can be coated on one or both sides of a backing to form a double-coated tape.

EXEMPLARY EMBODIMENTS

Embodiment 1 is a packaged pre-adhesive composition comprising: packaging material comprising: a semicrystalline polylactic acid (PLA); a polyvinyl acetate (PVAc); and a plasticizer; wherein the PLA/PVAc-containing packaging material has a single $T_g$ of less than 25° C. and a normalized Haze value of less than 10% per 25 microns; and polymerizable pre-adhesive reactive mixture sealed within the packaging material.

Embodiment 2 is the packaged pre-adhesive composition of embodiment 1 wherein the PLA/PVAc-containing packaging material has a single $T_g$ of at least −5° C.

Embodiment 3 is the packaged pre-adhesive composition of embodiment 1 or 2, wherein the PLA/PVAc-containing packaging material has a tensile elongation of at least 100%.

Embodiment 4 is the packaged pre-adhesive composition of any of embodiments 1 through 3, wherein the PLA/PVAc-containing packaging material has a tensile elongation of no greater than 600%.

Embodiment 5 is the packaged pre-adhesive composition of embodiment 4, wherein the PLA/PVAc-containing packaging material has a tensile elongation of 250% to 500%.

Embodiment 6 is the packaged pre-adhesive composition of any of embodiments 1 through 5, wherein the PLA/PVAc-containing packaging material has a tensile modulus of no greater than 1000 MPa.

Embodiment 7 is the packaged pre-adhesive composition of any of embodiments 1 through 6, wherein the PLA/PVAc-containing packaging material has a tensile modulus of at least 50 MPa. Embodiment 8 is the packaged pre-adhesive composition of embodiment 7, wherein the PLA/PVAc-containing packaging material has a tensile modulus of 100 MPa to 500 MPa.

Embodiment 9 is the packaged pre-adhesive composition of any of embodiments 1 through 8, wherein the PLA/PVAc-containing packaging material has a tensile strength of at least 5 MPa.

Embodiment 10 is the packaged pre-adhesive composition of any of embodiments 1 through 9, wherein the PLA/PVAc-containing packaging material has a tensile strength of no greater than 50 MPa.

Embodiment 11 is the packaged pre-adhesive composition of embodiment 10, wherein the PLA/PVAc-containing packaging material has a tensile strength of 10 MPa to 45 MPa.

Embodiment 12 is the packaged pre-adhesive composition of any of embodiments 1 through 11, wherein the polyvinyl acetate polymer has a $T_g$ of at least 25° C.

Embodiment 13 is the packaged pre-adhesive composition of embodiment 12, wherein the polyvinyl acetate polymer has a $T_g$ of no greater than 50° C.

Embodiment 14 is the packaged pre-adhesive composition of embodiment 12 or 13, wherein the polyvinyl acetate polymer is present in the PLA/PVAc-containing packaging material in an amount of 10 wt-% to 50 wt-%, based on the total weight of the PLA/PVAc-containing packaging material.

Embodiment 15 is the packaged pre-adhesive composition of any of embodiments 1 through 14, wherein the polyvinyl acetate polymer has a Mn or Mw, as determined by Size Exclusion Chromatography with polystyrene standards, of at least 50,000 g/mol.

Embodiment 16 is the packaged pre-adhesive composition of embodiment 15, wherein the plasticizer is present in the PLA/PVAc-containing packaging material in an amount of 5 wt-% to 35 wt-%, based on the total weight of the PLA/PVAc-containing packaging material.

Embodiment 17 is the packaged pre-adhesive composition of any of embodiments 1 through 16, wherein the polylactic acid polymer is present in the PLA/PVAc-containing packaging material an amount ranging from 40 wt-% to 80 wt-%, based on the total weight of the PLA/PVAc-containing packaging material.

Embodiment 18 is the packaged pre-adhesive composition of any of embodiments 1 through 17, wherein the semicrystalline polylactic acid polymer comprises at least 90 wt-% of polymerized units derived from L-lactic acid and less than 10 wt-% of polymerized units derived from D-lactic acid.

Embodiment 19 is the packaged pre-adhesive composition of any of embodiments 1 through 18, wherein the PLA/PVAc-containing packaging material further comprises a nucleating agent.

Embodiment 20 is the packaged pre-adhesive composition of embodiment 19, wherein the nucleating agent is present in the PLA/PVAc-containing packaging material in an amount of 0.01 wt-% to 1 wt-%, based on the total weight of the PLA/PVAc-containing packaging material.

Embodiment 21 is the packaged pre-adhesive composition of any of embodiments 1 through 20, wherein the PLA/PVAc-containing packaging material further comprises amorphous PLA.

Embodiment 22 is the packaged pre-adhesive composition of any of embodiments 1 through 21, wherein the polymerizable pre-adhesive reactive mixture comprises one or more (meth)acrylate monomers.

Embodiment 23 is the packaged pre-adhesive composition of embodiment 22, wherein the polymerizable pre-adhesive reactive mixture further comprises one or more polar monomers and other optional monomers.

Embodiment 24 is the packaged pre-adhesive composition of any of embodiments 1 through 21, wherein the amount of packaging material is at least 0.5 wt-%, based on the total weight of the pre-adhesive reactive mixture and the packaging material.

Embodiment 25 is the packaged pre-adhesive composition of embodiment 24, wherein the amount of packaging material is at least 3 wt-%, based on the total weight of the pre-adhesive reactive mixture and the packaging material.

Embodiment 26 is the packaged pre-adhesive composition of any of embodiments 1 through 25, wherein the amount of packaging material is up to 20 wt-%, based on the total weight of the pre-adhesive reactive mixture and the packaging material.

Embodiment 27 is the packaged pre-adhesive composition of embodiment 26, wherein the amount of packaging material is up to 10 wt-%, based on the total weight of the pre-adhesive reactive mixture and the packaging material.

Embodiment 28 is the packaged pre-adhesive composition of embodiment 27, wherein the amount of packaging material is up to 7 wt-%, based on the total weight of the pre-adhesive reactive mixture and the packaging material.

Embodiment 29 is a packaged adhesive composition formed by a method comprising exposing the packaged pre-adhesive composition of any of embodiments 1 through 28 to an appropriate energy source.

Embodiment 30 is an adhesive composition comprising: a (meth)acrylate-based polymer having a refractive index of at least 1.43; and PLA/PVAc-containing polymer particles, at least some of the particles having an average particle size that is larger than the wavelength of visible light, wherein the adhesive composition is optically transparent.

Embodiment 31 is the adhesive composition of embodiment 30, wherein the PLA/PVAc-containing polymer particles have a refractive index that is no more than ±0.02 of the refractive index of the (meth)acrylate-based polymer present in a major amount in the adhesive.

Embodiment 32 is the adhesive composition of embodiment 31, wherein the PLA/PVAc-containing polymer particles have a refractive index that is no more than ±0.01 of the refractive index of the (meth)acrylate-based polymer present in a major amount in the adhesive.

Embodiment 33 is the adhesive composition of any of embodiments 30 through 32, wherein the adhesive composition is optically clear, having a visible light transmission of greater than 90%, and a haze of less than 5%.

Embodiment 34 is the adhesive composition of any of embodiments 30 through 33, wherein the adhesive composition is crosslinked.

Embodiment 35 is the adhesive composition of any of embodiments 30 through 34, wherein the PLA/PVAc-containing polymer particles are prepared from a packaging material comprising: a semicrystalline polylactic acid (PLA); a polyvinyl acetate (PVAc) having a $T_g$ of at least 25° C.; and a plasticizer; wherein the PLA/PVAc-containing packaging material has a single $T_g$ of less than 25° C. and a normalized Haze value of less than 10% per 25 microns.

Embodiment 36 is the adhesive composition of any of embodiments 30 through 35, wherein the PLA/PVAc-containing polymer particles have a single $T_g$ of at least −5° C.

Embodiment 37 is the adhesive composition of any of embodiments 30 through 36, further comprising a nucleating agent.

Embodiment 38 is the adhesive composition of embodiment 37, wherein the nucleating agent comprises a salt of a phosphorous-containing aromatic organic acid.

Embodiment 39 is the adhesive composition of any of embodiments 30 through 38, wherein the plasticizer comprises a citrate-based plasticizer.

Embodiment 40 is the adhesive composition of any of embodiments 30 through 39, wherein the amount of PLA/PVAc-containing polymer particles is at least 0.5 wt-%, based on the total weight of the adhesive composition.

Embodiment 41 is the adhesive composition of embodiment 40, wherein the amount of PLA/PVAc-containing polymer particles is at least 3 wt-%, based on the total weight of the adhesive composition.

Embodiment 42 is the adhesive composition of any of embodiments 30 through 41, wherein the amount of PLA/PVAc-containing polymer particles is up to 20 wt-%, based on the total weight of the adhesive composition.

Embodiment 43 is the adhesive composition of embodiment 42, wherein the amount of PLA/PVAc-containing polymer particles is up to 10 wt-%, based on the total weight of the adhesive composition.

Embodiment 44 is the adhesive composition of embodiment 43, wherein the amount of PLA/PVAc-containing polymer particles is up to 7 wt-%, based on the total weight of the adhesive composition.

Embodiment 45 is an article comprising a substrate and an adhesive composition of any of embodiments 30 through 44 disposed on at least a portion of the substrate.

Embodiment 46 is the article of embodiment 45, wherein the substrate comprises a film, a tape backing, a graphic article, a light guide, a plastic article, a wound dressing, a protection film or tape, a light extraction layer, a keypad or membrane switch, a heat shrinkable layer or substrate, a display, a touch sensor, or a moldable film.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims. Unless otherwise noted, the amount of material is listed by weight, or by weight percent ("wt-%").

Materials

INGEO 4032D—a semicrystalline polylactic acid (PLA) (2 wt-% D-lactide; weight average molecular weight 200,000 g/mol), was purchased from NatureWorks, LLC.

VINAVIL K70—a polyvinyl acetate ($T_g$=42° C.; weight average molecular weight 400,000 g/mol), was obtained from Vinavil, Italy.

CITROFLEX A4—acetyl tributyl citrate, a plasticizer, was obtained from Vertellus Specialties, Inc., Bayonne, N.J.

ECOPROMOTE—zinc phenylphosphonate, a nucleation agent, was obtained from Nissan Chemical (Japan).

2-EHA—2-ethylhexyl acrylate monomer, was commercially available from Sigma Aldrich, St. Louis, Mo.

IOA—isooctyl acrylate, a monomer, was commercially available from Sigma Aldrich, St. Louis, Mo.

AA—acrylic acid, a monomer, was commercially available from BASF Corporation, Parsippany, N.J.

ABP—acryloyl benzophenone, a monomer which can be prepared using a method similar to that described in Temel et al., Journal of Photochemistry and Photobiology A: Chemistry, 219, 26-31 (2011).

IRGACURE 651—a photo-initiator, was commercially available from Ciba/BASF, Hawthorne, N.Y.

IRGACURE 1076—a photo-initiator, was commercially available from Ciba/BASF, Hawthorne, N.Y.

IOTG—isooctyl thioglycolate, a chain transfer agent, was commercially available from Ciba/BASF, Hawthorne, N.Y.

Test Methods

180 Degree Peel Strength Test Method

A 0.5 inch (in) (approximately 1.3 centimeters (cm)) wide by 6 inch (approximately 15 cm) long strip of adhesive was laminated onto a stainless steel panel using a roller. Dwell time was 30 minutes (min) in the CTH (constant temperature and humidity) room conditioned at 23° C./50% Relative Humidity (RH). Peel strength measurements are made using a 180 degree peel mode at 12 in/min (approximately 30 cm/min). Data were recorded as an average of 6 measurements.

Static Shear Test Method (23° C.)

Following ASTM Designation: D3654/D3654M-06 (2011), a 0.5 inch (approximately 1.3 cm) wide strip of adhesive was laminated onto a stainless steel panel using a roller, covering a 0.5 inch (approximately 1.3 cm) by 1 inch (approximately 2.5 cm) area of the panel. A 1 kilogram (kg) weight was used as the static load and the test samples were placed on an automatic timing apparatus in the CTH room conditioned at 23° C./50% RH. The time until failure was measured and recorded in minutes. Data were recorded as an average of 2 measurements.

Static Shear Test Method (70° C.)

Following ASTM Designation: D3654/D3654M-06 (2011), a 1 inch (approximately 2.5 cm) wide strip of adhesive was laminated onto a stainless steel panel using a roller, covering a 1 inch (approximately 2.5 cm) by 1 inch (approximately 2.5 cm) area of the panel. A 1 kg weight was used as the static load and the test samples were placed on an automatic timing apparatus in the oven at 70° C. The time until failure was measured and recorded in minutes. Data were recorded as an average of 2 measurements.

Haze Measurement

Haze measurements were made on a HAZE-GARD PLUS instrument (BYK Additives & Instruments) in transmission mode. Adhesive samples were cut to approximately 5 cm length by 10 cm length. One of the carrier liners was removed and the sample was laminated to a clear piece of glass. The other liner was then removed and the sample was placed in the HAZE-GARD PLUS instrument to measure the haze value through the adhesive sample and glass assembly.

Film samples were measured directly, and the normalized haze values to the film thickness were calculated according to the following equation:

$$\text{Normalized haze } (\%/\text{mil}) = \frac{\text{Haze } (\%)}{\text{Film thickness (mil)}}$$

The normalized haze was converted from %/mil to %/micrometer according to the equation: %/micrometer=[%/mil]×[1 mil/25 micrometers].

DSC—Differential Scanning Calorimetry

The glass transition temperature, crystallization temperature and crystallinity of each sample was measured using a TA INSTRUMENTS DIFFERENTIAL SCANNING CALORIMETER according to ASTM D3418-12 unless specified otherwise. Each sample (4 8-milligram (mg) samples) was heated from −60° C. to 200° C. at 10° C./min in a first heating scan and held for 2 minutes to erase its thermal history, then cooled to −60° C. at 5° C./min in a first cooling scan, and heated to 200° C. at 10° C./min in a second heating scan. The first heating scan was used to determine Tm of the films. The second heating scan was used to determine $T_g$ of the films. Various parameters were derived from the DSC as defined as follows:

$T_g$ refers to the midpoint temperature of the second heating scan, described as $T_{mg}$ in ASTM D3418-12.

$T_m$ refer to the melting peak temperature of the first heating scan, described as $T_{pm}$ in ASTM D3418-12.

Tensile Testing

The film samples were cut into 0.5 inch (approximately 1.2 cm) wide strips. The tensile testing was conducted along the machine direction (MD) and transverse direction (TD) of the film extrusion, using an INSTRON 3365 TENSILE TESTER. The initial grip distance was at 1 inch (approximately 2.5 cm) and the tensile speed was at 1 inch/min (approximately 2.5 cm/min) (i.e., 100% strain/min). Test results were reported as the average of 5 sample replicates. The tensile strength (nominal), tensile elongation (percent elongation at break), and tensile modulus were determined, as described by sections 11.3 and 11.5 of ASTM D882-10.

Refractive Index Measurement

Refractive index measurements of film and adhesive were measured using the METRICON 2010M PRISM COUPLER made by Metricon Corporation of Pennington, N.J., USA.

Examples 1 (EX-1)

A 3.8-mil (approximately 97-micrometer) thick polylactic acid/polyvinyl acetate (PLA/PVAc) film (EX-1) was prepared, consisting of 49.8 parts by weight of INGEO 4032D, 35 parts by weight of VINAVIL K70, 15 parts by weight of CITROFLEX A4 and 0.2 part by weight of ECOPROMOTE. The film was made via a twin screw extrusion process and was cast onto a poly(ethylene terephthalate) liner. The resulting plasticized PLA/PVAc film was then fully crystallized offline in an oven at about 104° F. to about 122° F. (about 40° C. to about 50° C.) for a few hours.

Example 2 (EX-2)

A second plasticized PLA/PVAc film (EX-2) was prepared according to the process described for making the film of EX-1, except that the film was made from 64.8 parts by weight of INGEO 4032D, 20 parts by weight of VINAVIL K70, 15 parts by weight of CITROFLEX A4 and 0.2 part by weight of ECOPROMOTE.

DSC and Tensile Testing measurements were performed on samples of the EX-1 and EX-2 materials, with results as summarized in Table 1.

TABLE 1

Thermal and tensile data for Examples 1 and 2

| Film | $T_g$ (° C.) | $T_m$ (° C.) | Tensile Strength (MPa) | Tensile Elongation, percent | Tensile Modulus (MPa) |
|---|---|---|---|---|---|
| EX-1 | 8 | 159 | 36.9 (MD) | 276% (MD) | 232 (MD) |
|  |  |  | 28.4 (TD) | 306% (TD) | 201 (TD) |
| EX-2 | 8 | 158 | 40.5 (MD) | 282% (MD) | 404 (MD) |
|  |  |  | 35.6 (TD) | 327% (TD) | 405 (TD) |

In Table 1, MD = machine direction; TD = transverse direction.

Haze measurement of the plasticized PLA/PVAc films of EX-1 and EX-2 and a comparative heat-sealable ethylene vinyl acetate (EVA) film ("CE-1," available from Berry Plastics Corporation, Evansville, Ind.) was performed, with results as summarized in Table 2.

TABLE 2

Haze data for Examples 1-2 and Comparative Example 1

| Film | Thickness, mils (micrometers) | Haze, percent | Normalized haze/thickness, %/mil (%/micrometer) |
|---|---|---|---|
| EX-1 | 3.8 (approx. 97) | 5.8 | 1.5 (0.06) |
| EX-2 | 2.5 (approx. 63) | 5.7 | 2.3 (0.09) |
| CE-1 | 2.3 (approx. 58) | 21.5 | 9.3 (0.37) |

Example 3 (EX-3)

A monomer mixture was prepared by combining 95 parts by weight of 2-EHA, 5 parts by weight of AA, 0.03 part by weight of IOTG, and 0.15 part by weight of IRGACURE 651, to prepare a solution of acrylate monomer.

Packages were produced by heat sealing two pieces of plasticized PLA/PVAc films of Example 1 together, using an impulse heat sealer (American International Electric, Inc.). The lateral ends and bottom end of the films were heat-sealed to obtain a small rectangular container (length 12 cm by width 4 cm). Then, approximately 25 grams of monomer mixture as prepared above was added to the container. The upper end of the container was then heat sealed to produce a package containing monomer mixture. The package was then placed in a water bath that was maintained at 16° C., and exposed to ultraviolet radiation at an intensity of about 4.5 miliWatts per square centimeter (mW/cm²) for 8 minutes on each side of the package. The radiation was supplied by lamps having about 90% of the emission between 300 and 400 nanometers (nm) and peak emission at 351 nm.

After UV polymerization, the PLA/PVAc-based package was inspected and no leakage of monomer was detected. The UV-cured adhesive was then melt blended with its package in a twin-screw micro-compounder (DSM Xplore) at 170° C. for 10 minutes. The mixture of UV-cured adhesive and PLA/PVAc-based package was then melt pressed into a 2 mil (approximately 50 micrometers) thick layer to measure its haze value. A comparison of haze values between the UV-cured adhesives made with the PLA/PVAc-based package and a comparative EVA package ("CE-2") gave results as summarized in Table 3.

Example 4 (EX-4)

A monomer mixture was prepared by combining 96 parts by weight of IOA, 4 parts by weight of AA, 0.075 parts by weight of ABP, 0.025 part by weight of IOTG, 0.15 part by weight of IRGACURE 651, and 0.2 part by weight of IRGACURE 1076 to prepare a solution of acrylate monomer.

Packages were produced by heat sealing two pieces of plasticized PLA/PVAc films of Example 2 together, using an impulse heat sealer (American International Electric, Inc.). The lateral ends and bottom end of the films were heat-sealed to obtain a small rectangular container (18 cm long by 5 cm wide). Then, approximately 25 grams of the monomer mixture was added to the container. The upper end of the container was then heat sealed to produce a package containing monomer mixture. The package was then placed in a water bath that was maintained at 16° C., and exposed to ultraviolet radiation at an intensity of about 4.5 mW/cm² for 8 minutes on each side of the package. The radiation was supplied by lamps having about 90% of the emission between 300 and 400 nm and peak emission at 351 nm.

After UV polymerization, the PLA/PVAc-based package was inspected and no leakage of monomer was detected. The UV-cured adhesive was then melt blended with its package using a small scale twin screw extruder and then coated onto release liners using a 6 inch (approximately 15 cm) wide drop die. The extrusion temperature for the die and extruder was kept at 300° F. (149° C.). This sample was coated to 2 mil (approximately 50 micrometers) thickness, and its haze value was measured and included in Table 3.

TABLE 3

Haze data of Examples 3-4 and Comparative Example 2 after the UV-cured adhesive and the packaging material were melted and mixed together

| Sample | Packaging material | Haze (percent) of 2 mil (approximately 51 micrometers) UV-cured polymer |
|---|---|---|
| EX-3 | EX-1 | 1.6 |
| EX-4 | EX-2 | 1.7 |
| CE-2 | CE-1 | 15 |

Example 5 (EX-5)

Monomer mixture was prepared by combining 95 parts by weight of IOA, 5 parts by weight of AA, 0.15 part by weight of ABP, 0.02 part by weight of IOTG, 0.15 part by weight of IRGACURE 651, and 0.2 part by weight of IRGACURE 1076 to prepare a solution of acrylate monomer.

Packages were produced by heat sealing two pieces of plasticized PLA/PVAc films of Example 2 together, using an impulse heat sealer (American International Electric, Inc.). The lateral ends and bottom end of the films were heat-sealed to obtain a small rectangular container (18 cm long by 5 cm wide). Then, approximately 25 grams of monomer mixture as prepared above was added to the container. The upper end of the container was then heat sealed to produce a package containing monomer mixture. The package was then placed in a water bath that was maintained at 16° C., and exposed to ultraviolet radiation at an intensity of about 4.5 mW/cm$^2$ for 8 minutes on each side of the package. The radiation was supplied by lamps having about 90% of the emission between 300 nm and 400 nm and peak emission at 351 nm.

After UV polymerization, the PLA/PVAc-based package was inspected and no leakage of monomer was detected. The UV-cured adhesive was then melt blended with its package using a small scale twin screw extruder and then coated onto release liners using a 6 inch wide drop die. The extrusion temperature for the die and extruder was kept at 320° F. (approximately 160° C.). The sample was coated to 3 mils (75 micrometers) thickness specified onto a standard polykraft coated paper release carrier. The sample was then transferred onto Mitsubishi 3 SAB PET film (Mitsubishi, Greer, S.C., USA) and UV cured with 200 miliJoules (mJ) dose of UV-B radiation using a UV processor from American Ultraviolet Co. (Murray Hill, N.J., USA). The processor contains two medium pressure mercury arc lamps, each of which was operated at a power level of 200 Watts/inch (W/in). The line speed was adjusted to achieve the desired dose in the UV-B spectral region.

Adhesion performance of the resulting material was evaluated by the 180 degree Peel Strength Test Method and the Static Shear Test Methods, with results as summarized in Table 4.

Comparative Example 3 (CE-3)

This sample was prepared in parallel as Example 5, except that the packaging material was made of ethylene vinyl acetate film of CE-1.

TABLE 4

Peel and shear data for Examples 3-5

| Adhesive | Thickness, mils (micrometers) | 180 degree peel adhesion, oz/0.5 inch (N/dm) | Static Shear, minutes (temperature) |
|---|---|---|---|
| EX-3 (melt blended mixture of the UV-cured polymer and its plasticized PLA/PVAc package) | 4.5 (approx. 114) | 30.2 (approx. 66.1) | 6 (23° C.) |
| EX-4 (melt blended mixture of the UV-cured polymer and its plasticized PLA/PVAc package) | 2 (approx. 50) | 84.9 (approx. 185.8) | 2 (23° C.) |
| EX-5 (melt blended mixture of the UV-cured polymer and its plasticized PLA/PVAc package, which was then crosslinked with 200 mJ UV-B radiation) | 3 (approx. 75) | 17.5 (approx. 38.3) | +100,000 (70° C.) |

TABLE 5

Peel and shear data for Example 5 and Comparative Example 3

| Adhesive | Thickness, mils (micrometers) | 180 degree peel adhesion, oz/0.5 inch (N/dm) | Static Shear, minutes (temperature) |
|---|---|---|---|
| EX-5 (melt blended mixture of the UV-cured polymer and its plasticized PLA/PVAc package, which was then crosslinked with 200 mJ UV-B radiation) | 3 (approx. 75) | 17.5 (approx. 38.3) | +100,000 (70° C.) |

TABLE 5-continued

Peel and shear data for Example 5 and Comparative Example 3

| Adhesive | Thickness, mils (micrometers) | 180 degree peel adhesion, oz/0.5 inch (N/dm) | Static Shear, minutes (temperature) |
| --- | --- | --- | --- |
| CE-3 (melt blended mixture of the UV-cured polymer and ethylene vinyl acetate package, which was then crosslinked with 200 mJ UV-B radiation) | 3 (approx. 75) | 18 (approx. 39.4) | +100,000 (70° C.) |

TABLE 6

Refractive Index data for Comparative Example 1 and Examples 1, 2, 4, and 5

| Sample | Type | Refractive Index |
| --- | --- | --- |
| CE-1 | Packaging material alone | 1.51 |
| EX-1 | Packaging material alone | 1.459 |
| EX-2 | Packaging material alone | 1.457 |
| EX-4 | Melt-blended adhesive (including packaging material) | 1.467 |
| EX-5 | Melt-blended adhesive (including packaging material), with additional UV irradiation | 1.468 |

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A packaged pre-adhesive composition comprising:
    packaging material comprising:
        a semicrystalline polylactic acid (PLA);
        a polyvinyl acetate (PVAc); and
        a plasticizer;
        wherein the PLA/PVAc-containing packaging material has a single $T_g$ of less than 25° C. and a normalized Haze value of less than 10% per 25 microns; and
    a polymerizable pre-adhesive reactive mixture sealed within the packaging material.

2. The packaged pre-adhesive composition of claim 1, wherein the PLA/PVAc-containing packaging material has a single $T_g$ of at least −5° C.

3. The packaged pre-adhesive composition of claim 1, wherein the PLA/PVAc-containing packaging material has a tensile elongation of at least 100%.

4. The packaged pre-adhesive composition of claim 1, wherein the PLA/PVAc-containing packaging material has a tensile modulus of no greater than 1000 MPa.

5. The packaged pre-adhesive composition of claim 1, wherein the PLA/PVAc-containing packaging material has a tensile strength of at least 5 MPa.

6. The packaged pre-adhesive composition of claim 1, wherein the polyvinyl acetate polymer is present in the PLA/PVAc-containing packaging material in an amount of 10 wt-% to 50 wt-%, based on the total weight of the PLA/PVAc-containing packaging material.

7. The packaged pre-adhesive composition of claim 1, wherein the plasticizer is present in the PLA/PVAc-containing packaging material in an amount of 5 wt-% to 35 wt-%, based on the total weight of the PLA/PVAc-containing packaging material.

8. The packaged pre-adhesive composition of claim 1, wherein the polylactic acid polymer is present in the PLA/PVAc-containing packaging material an amount ranging from 40 wt-% to 80 wt-%, based on the total weight of the PLA/PVAc-containing packaging material.

9. The packaged pre-adhesive composition of claim 1, wherein the semicrystalline polylactic acid polymer comprises at least 90 wt-% of polymerized units derived from L-lactic acid and less than 10 wt-% of polymerized units derived from D-lactic acid.

10. The packaged pre-adhesive composition of claim 1, wherein the PLA/PVAc-containing packaging material further comprises a nucleating agent.

11. The packaged pre-adhesive composition of claim 1, wherein the polymerizable pre-adhesive reactive mixture comprises one or more (meth)acrylate monomers.

12. The packaged pre-adhesive composition of claim 1, wherein the amount of packaging material is at least 0.5 wt-% and up to 20 wt-%, based on the total weight of the pre-adhesive reactive mixture and the packaging material.

13. The adhesive composition of claim 12, wherein the amount of packaging material is at least 3 wt-% and up to 7 wt-%, based on the total weight of the pre-adhesive reactive mixture and the packaging material.

14. An adhesive composition comprising:
    a (meth)acrylate-based polymer having a refractive index of at least 1.43; and
    PLA/PVAc-containing polymer particles, at least some of the particles having an average particle size that is larger than the wavelength of visible light, wherein the adhesive composition is optically transparent.

15. The adhesive composition of claim 14, wherein the PLA/PVAc-containing polymer particles have a refractive index that is no more than ±0.02 of the refractive index of the (meth)acrylate-based polymer present in a major amount in the adhesive.

16. The adhesive composition of claim 14, wherein the adhesive composition is optically clear, having a visible light transmission of greater than 90%, and a haze of less than 5%.

17. The adhesive composition of claim 14, wherein the PLA/PVAc-containing polymer particles are prepared from a packaging material comprising:
    a semicrystalline polylactic acid (PLA);
    a polyvinyl acetate (PVAc) having a $T_g$ of at least 25° C.; and
    a plasticizer;

wherein the PLA/PVAc-containing packaging material has a single $T_g$ of less than 25° C. and a normalized Haze value of less than 10% per 25 microns.

18. The adhesive composition of claim 14, wherein the amount of PLA/PVAc-containing particles is at least 0.5 wt-% and up to 20 wt-%, based on the total weight of the adhesive composition.

19. An article comprising:
a substrate; and
an adhesive composition of claim 14 disposed on at least a portion of the substrate.

* * * * *